United States Patent
Adrangi et al.

(10) Patent No.: US 9,923,721 B2
(45) Date of Patent: Mar. 20, 2018

(54) KEY AGREEMENT AND AUTHENTICATION FOR WIRELESS COMMUNICATION

(71) Applicant: Intel IP Corporation, Santa Clara, CA (US)

(72) Inventors: Farid Adrangi, Lake Oswego, OR (US); Emily H. Qi, Portland, OR (US); Ganesh Venkatesan, Hillsboro, OR (US); Alexandre Saso Stojanovski, Paris (FR)

(73) Assignee: Intel IP Corporation, Santa Clara, CA (US)

( * ) Notice: Subject to any disclaimer, the term of this patent is extended or adjusted under 35 U.S.C. 154(b) by 126 days.

(21) Appl. No.: 14/973,211

(22) Filed: Dec. 17, 2015

(65) Prior Publication Data

US 2016/0373257 A1 Dec. 22, 2016

Related U.S. Application Data

(60) Provisional application No. 62/183,002, filed on Jun. 22, 2015.

(51) Int. Cl.
*H04L 9/12* (2006.01)
*H04L 9/32* (2006.01)
(Continued)

(52) U.S. Cl.
CPC ............. *H04L 9/321* (2013.01); *H04L 9/006* (2013.01); *H04L 9/14* (2013.01); *H04W 12/02* (2013.01);
(Continued)

(58) Field of Classification Search
None
See application file for complete search history.

(56) References Cited

U.S. PATENT DOCUMENTS

| 9,197,700 B2 * | 11/2015 | Brouwer | H04L 67/104 |
| 2010/0246824 A1 * | 9/2010 | Xiao | H04L 63/061 380/270 |

(Continued)

FOREIGN PATENT DOCUMENTS

WO WO 2015065063 A1 * 5/2015 ............ H04L 9/0825

OTHER PUBLICATIONS

PAuth: A Peer-to-Peer Authentication Protocol. Gao et al.2015.*
(Continued)

*Primary Examiner* — Venkat Perungavoor
(74) *Attorney, Agent, or Firm* — Schwegman Lundberg & Woessner, P.A.

(57) ABSTRACT

Generally discussed herein are systems, apparatuses, and methods that can provide a key authentication and identity verification in a D2D communication regime. A method can include providing a first public key of a first D2D device to a second D2D device and receiving a second public key of the second D2D device, providing a connection request packet to the second D2D device including a first attested key and a third public key, the first attested key including the first public key signed using a private key of a public key attestation service (PAS), receiving a connection accept packet from the second D2D device including a second attested public key, and a fourth public key, the second attested public key including the second public key signed using the private key of the PAS, and verifying the identity of the second D2D device using the received keys.

17 Claims, 5 Drawing Sheets

(51) Int. Cl.
    *H04W 12/04*     (2009.01)
    *H04L 9/00*     (2006.01)
    *H04L 9/14*     (2006.01)
    *H04W 12/02*     (2009.01)
    *H04W 76/02*     (2009.01)
    *G06F 21/62*     (2013.01)

(52) U.S. Cl.
    CPC ......... *H04W 12/04* (2013.01); *H04W 76/023* (2013.01)

(56) References Cited

U.S. PATENT DOCUMENTS

| | | | | |
|---|---|---|---|---|
| 2011/0131406 A1* | 6/2011 | Jones | ................. | H04L 65/1053 |
| | | | | 713/150 |
| 2011/0173259 A1* | 7/2011 | Setton | ................... | H04L 9/3247 |
| | | | | 709/204 |
| 2015/0312331 A1* | 10/2015 | Crocker | ............... | H04L 67/104 |
| | | | | 709/205 |
| 2015/0319151 A1* | 11/2015 | Chastain | .............. | H04W 12/04 |
| | | | | 713/171 |
| 2015/0326692 A1* | 11/2015 | Kaneko | .................. | G06F 21/41 |
| | | | | 713/171 |
| 2015/0334097 A1* | 11/2015 | Mundhra | ............... | H04L 63/06 |
| | | | | 713/171 |

OTHER PUBLICATIONS

Constructing a Secure Point-to-Point Wireless Environment Integrating Diffie-Hellman PKDS RSA and Stream Ciphering for Users Known to Each OTher. Huang et al. 2011.*

* cited by examiner

| ATTESTED PUBLIC KEY DEVICE A 402 | PUBLIC KEY DEVICE A 404 | ID DEVICE A 406 | NONCE VALUE DEVICE A 408 | PUBLIC KEY, A 410 | PRIME NUMBER, p 412 | PRIMITIVE ROOT MODULO p, g 414 |

| ATTESTED PUBLIC KEY DEVICE B 502 | PUBLIC KEY DEVICE B 504 | ID DEVICE B 506 | NONCE VALUE DEVICE B 508 | NONCE VALUE DEVICE A 408 | PUBLIC KEY, B 510 |

KEY AGREEMENT AND AUTHENTICATION FOR WIRELESS COMMUNICATION

RELATED APPLICATIONS

This application claims the benefit of priority to U.S. Provisional Patent Application Ser. No. 62/183,002, filed on Jun. 22, 2015 which is incorporated herein by reference in its entirety.

TECHNICAL FIELD

Examples discussed herein generally relate to device-to-device (D2D) connectivity and/or security, such as in a Neighbor Aware Networking (NAN2) or a Proximity Services (ProSe) network.

BACKGROUND

Neighbor Awareness Networking (NAN2), official program name is Wi-Fi Aware, is a specification for Wi-Fi devices, that when enabled on a device, provides device and/or service discovery with one or more devices and/or services in sufficient proximity thereto. A similar program exists for Long-Term Evolution (LTE) devices called ProSe. Both programs are D2D communication protocols. Using these D2D protocols, a cluster of devices can be formed. Devices in the same D2D cluster can follow a time schedule, called a discovery window, to facilitate cluster formation and achieve low power discovery operation. After the discovery process, devices can then have D2D data transmission without infrastructure like an Access Point (AP) (or internet connectivity), a base station (or cellular network connectivity). One goal of D2D protocols is to design mechanisms to facilitate many-to-many or any-to-any data transmission without infrastructure (or internet connectivity) support.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 4 illustrates, by way of example, a connection request packet in accord with one or more embodiments.

FIG. 5 illustrates, by way of example, a connection accept packet in accord with one or more embodiments.

DESCRIPTION OF EMBODIMENTS

Figure 1:
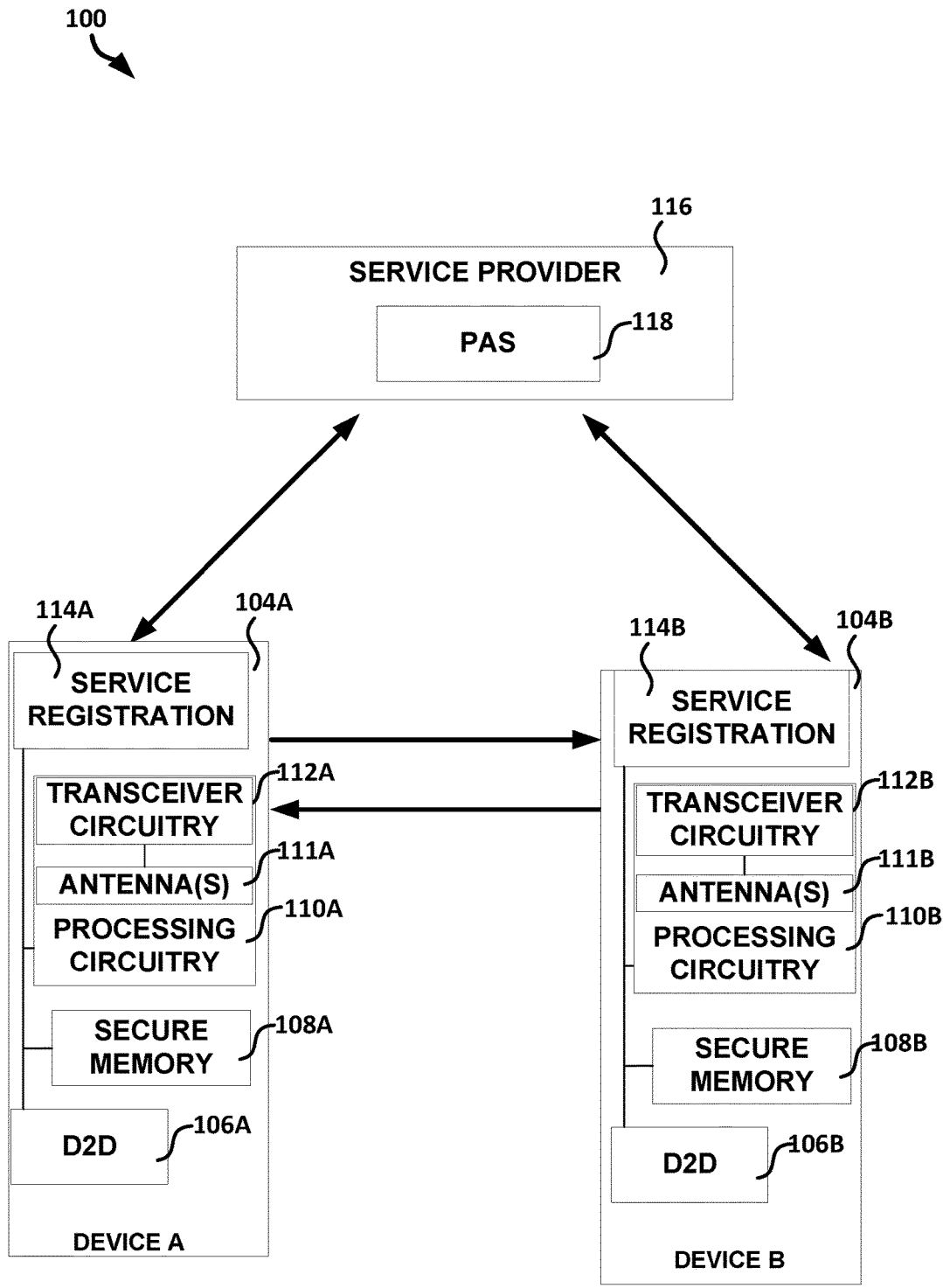
FIG. 1 illustrates, by way of example, a block diagram of a system for secure and/or authenticated D2D communication, in accord with one or more embodiments.

Examples in this disclosure relate generally to mechanisms for providing secure D2D (sometimes referred to as "peer-to-peer" (P2P)) communication. Examples discussed herein can relate to a NAN2 enable devices, ProSe enabled devices, or other D2D communication protocol.

Consider some example use cases in which D2D communication may be beneficial. In a first example, Alice and Bob each have NAN2 or ProSe enabled device. Alice and Bob happen to be in an area where there is no Wi-Fi or LTE connectivity (e.g., in a rural area or a location with a high density of devices, like a stadium during a sports match). After Alice discovers Bob in the proximity, Alice's device can establish a connection with Bob's device, such as by using an 802.11i, Wireless Protected Access (WPA) (in the case of a NAN2 enabled device), or a PC5 reference point connection procedure (in the case of a ProSe enabled device). In a second example, in the realm of internet of things (IOT), two headless Wi-Fi devices may discover each other and establish a connection using a NAN2 protocol. For example, a Wi-Fi motion sensor and Wi-Fi camera installed in a house or business premise. In response to detecting motion, the motion sensor may provide signals to control the Wi-Fi camera to start/stop recording. In this example, it may be beneficial for such devices to automatically discover each other and establish a connection.

D2D communications can benefit from a security policy that provides authenticity and/or confidentiality. While the remaining discussion is generally in the context of a NAN2 enabled device, similar features can be used in the ProSe D2D communication architecture to help secure and/or authenticate communications. The existing 802.11i security framework is designed for infrastructure based on a Wi-Fi architecture. Thus, this security is not applicable to the so called non-infrastructure communications of D2D communications.

A D2D application can run on a variety of devices that can include different compute and security capabilities. A security mechanism for D2D communication can thus benefit from being flexible enough to handle the variety of security and compute capabilities, such as may be provided without compromising user experience. One or more embodiments discussed herein provide a secure provisioning framework and/or protocol that can work on top of an 802.11i/WPA security architecture, such as to enable secure NAN2 communication.

In one or more embodiments, an 802.11i/WPA security framework is supplemented with a dynamic key agreement using a self-signed public key, such as can include or not include a certificate, attested by a trusted third party and another key agreement protocol, such as Diffie Hellman, Elgamal, RSA (Rivest, Shamir, and Adleman), or the Digital Signature Algorithm (DSA). The keys can be used to enable D2D peers to establish an 802.11i/WPA connection by dynamically generating a fresh 802.11i/WPA Pairwise Master Key (PMK) on the two devices for each 802.11i/WPA session.

FIG. 1 illustrates, by way of example, a block diagram of a system 100 for secure and/or authenticated D2D communication, in accord with one or more embodiments. The system 100 as illustrated includes a first device 104A ("Device A" in FIG. 1) capable of communicating with a second device 104B ("Device B" in FIG. 1). Both of the devices 104A-B are capable of communicating with a service provider 116, such as through a Wi-Fi or Long Term Evolution (LTE) network connection.

In one or more embodiments, the device 104B is a smartphone, tablet, or other device capable of Wi-Fi or other network connectivity. The devices 104A-B as illustrated each include a D2D application 106A and 106B, a secure memory 108A and 108B, processing circuitry 110A and 110B (e.g., transceiver circuitry 112A and 112B and/or one or more antenna(s) 111A and 111B), and a service registration application 114A and 114B.

The D2D application 106A-B, along with the processing circuitry 110A-B, provides D2D capability to the device 104A-B. For example, the D2D application 106A-B can interpret signals received at the transceiver 112B and/or processing circuitry 110B and provide signals to the processing circuitry 110A-B and/or transceiver 112A-B in response to the interpreted signals, such as to provide the D2D capability. The operations performed by the D2D application 106A-B can conform to the NAN Technical Specification (the "Specification") provided by the Wi-Fi Alliance, which is incorporated herein by reference in its entirety, or a third generation partnership project (3GPP) LTE standard publication such as TR 22.803, TS 22.278, TS 22.115, TS 21.905, TR 23.703, TS 23.303, TR 33.833, TR 36.843, TS 24.333, TS 24.334, SP-65, RP-63, R1-72b, R1-74b, R1-75, and R1-76, which are incorporated herein by reference in their entireties. The devices 104A-B are D2D devices in accord with the definition of the respective specification requirements. Using the D2D application, the devices 104A-B can publish and/or subscribe to content provided by other D2D devices in sufficient proximity to the device 104A-B.

Generally, the D2D device 104A-B will have wireless capability, such as Long Term Evolution (LTE) network connectivity or Wi-Fi network connectivity capabilities. However, such network connectivity and infrastructure is not required or even necessary for D2D communication.

The secure memory 108A-B includes encrypted data, such as can include one or more key(s) and/or identification(s). The data stored in the memory 108A-B can be encrypted so as to help protect the data from a covert operation, such as an attempt to steal a private or public key.

The processing circuitry 110A-B includes electric and/or electronic components arranged to perform operations (e.g., calculations, issue commands, respond to received signals, encrypt and/or decrypt data, or the like). Electric and/or electronic components can include one or more transistors, resistors, capacitors, inductors, multiplexers, arithmetic logic units, Boolean logic gates (e.g., AND, OR, NAND, NOR, or other logic gates) or other combinational logic, such as inverters, state logic, oscillators, diodes, switches, current and/or voltage regulators, application specific integrated circuits (ASICs), power supplies, current and/or voltage supplies, amplifiers, or the like. The operations can include operations requested by the D2D application 106A-B, the service registration application 114A-B, or in response to data received at the transceiver circuitry 112A-B. The processing circuitry 110A-B can perform cryptography operations, such as signing a key, decrypting a key, generating public and private keys, providing a signed public or private key, perform calculations in verifying an identity of another device or user, or the like.

The transceiver circuitry 112A-B includes electric and/or electronic components to receive electromagnetic transmissions, modulate and demodulate electromagnetic to be transmitted and received, respectively, and transmit electromagnetic signals at a specific frequency or bandwidth of frequencies. The transceiver circuitry 112A-B includes one or more antennas that converts electromagnetic radiation into an electrical signal and vice versa.

The antenna(s) 111A-B converts electromagnetic radiation into electrical signal(s) and vice versa. The antenna(s) may be uni-directional, multi-directional, or omni-directional.

The combination of the processing circuitry 110A-B and the transceiver circuitry 112A-B of the device 104A-B provides an ability to implement a dynamic authenticated key agreement protocol between D2D devices. For example, using one or more keys from the service provider 116 and/or one or more keys generated by the device 104A-B, the processing circuitry 110A-B can determine a pairwise master key (PMK). The PMK can be used to establish a connection between devices that conforms to the 802.11i or wireless protected access protocol.

The service registration application 114A-B provides the device 104A-B with the capability to connect with the service provider 116, register with the service provider 116 and receive a public key of the device 104A-B signed by the service provider. In one or more embodiments, the service provider 116 provides the device 104A-B with the service provider's public key to help allow the device 104A-B to verify an identity of another device that wishes to communicate with the device 104A-B. The public key as signed by the service provider is sometimes referred to as an attested public key.

The service provider 116 includes a public attestation service (PAS) application 118. The PAS application 118 receives requests for attestation along with proof of identity information and public key information. Proof of identity information can include a certificate (i.e. a public key of the entity requesting attestation, a name or user identification of the entity, and one or more digital signatures) or other information that can be used to verify that the entity requesting attestation is who they assert they are. A digital signature is data encrypted with an entity's private key that can be decrypted with the same entity's public key. The PAS application 118 can produce a certificate in response to receiving sufficient information from a requestor. In one or more embodiments, the service provider 116 is a Certification Authority (CA) (or an entity designated by the CA) and the certificate generated by the service provider 116 is an X.509 certificate.

To obtain an X.509 certificate, the device 104A-B (e.g., the service registration application 114A-B) asks a CA (the service provider 116) to issue a certificate. The device 104A-B provides a public key, proof that it possess the corresponding private key (e.g., a piece of data encrypted using the private key that can only be decrypted with a corresponding public key, such as a digital signature), and some specific information about the device 104A-B or the entity associated with the device 104A-B. The device 104A-B then digitally signs the information and sends the signed package, sometime referred to as a request to the CA. The CA may then perform some due diligence in verifying that the information provided is correct. If it is correct, the CA generates the certificate and returns it to the requestor.

Figure 2:
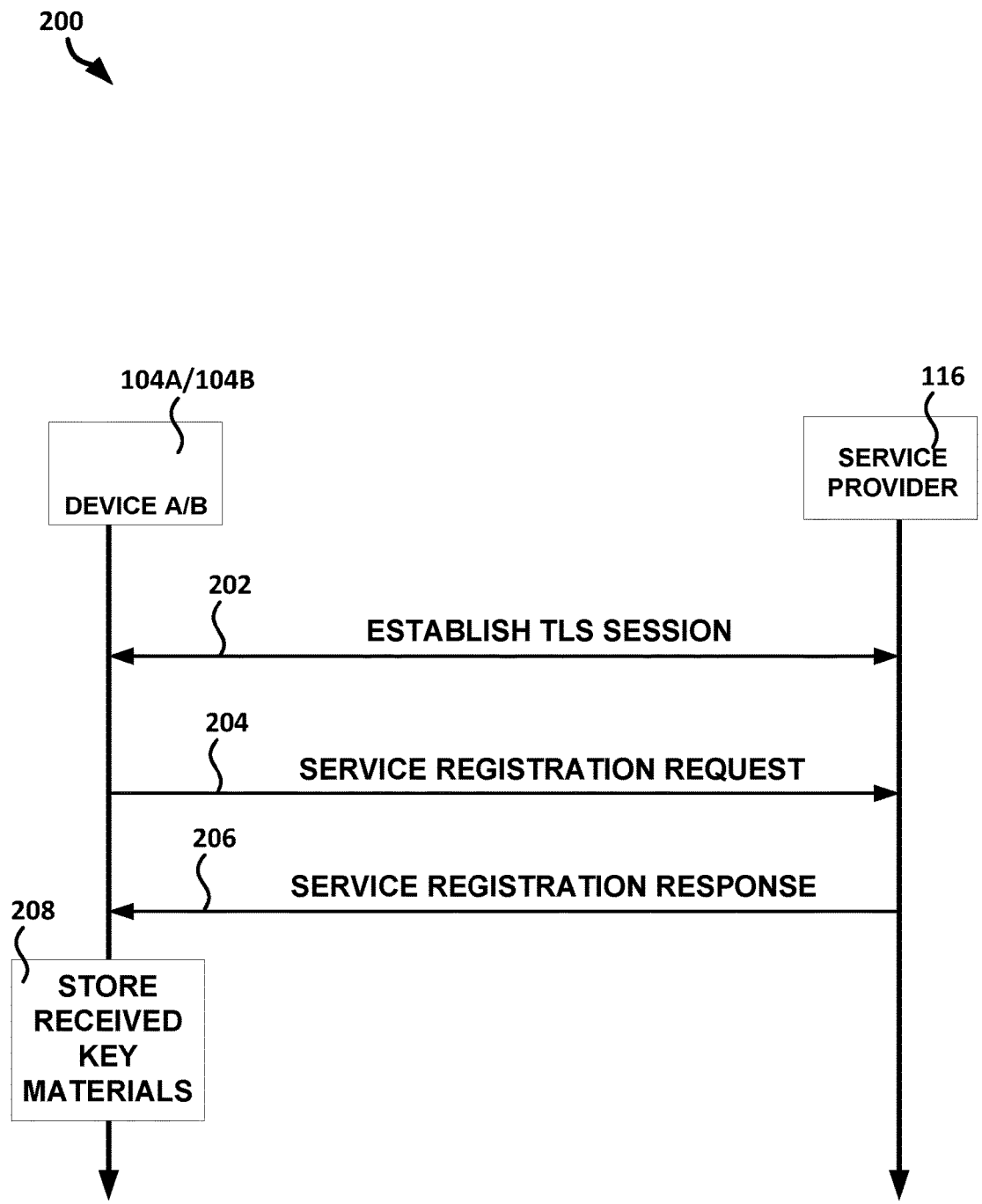
FIG. 2 illustrates, by way of example, a method for a device to register with a service provider and receive an attested key in accord with one or more embodiments.

FIG. 2 illustrates a method 200 for a device to register with a service provider and receive an attested key in accord with one or more embodiments. The method 200 includes the device 104A-B and the service provider 116 establishing a transport layer security (TLS) session at operation(s) 202. The session is generally for the device 104A-B to register a user's identity with the service provider 116, such as to provide credibility or trustworthiness to the user's identity. To register the user's identity with the service provider 116, the device 104A-B proves the device's self-signed public key to the service provider 116.

At operation 204, the device 104A-B provides a service registration request to the service provider 116. The operation 204 is generally a subscription request to the service provider 116. The operation 204 includes information for the device 104A-B to prove the user's identity with the service provider 116. In one or more embodiments, the service provider 116 can provide NAN 2 services, such that the device 104A-B does not require a network connection to access the services of the service provider 116. In one or more embodiments, the service provider 116 requires the device 104A-B to have network connection capability (Wi-Fi enabled or LTE enabled) to access services of the service provider 116.

The operation at 204 can include the device 104A-B providing a self-signed public key, proof of identity information, a generated public key, or other information required by the service provider 116 to receive the attested key. The self-signed public key can include a public key generated by the processing circuitry 110A-B and signed using a private key generated by the processing circuitry 110A-B. The signed public key can be decrypted using a public key of the device 104A-B. In one or more embodiments, the requirements of the registration request are consistent with the requirements of an X.509 or a Pretty Good Privacy (PGP) certificate request.

The method 200 includes receiving, at the device, a service registration response at operation 206. An attested key can be provided to the device 104A-B at operation 206. The attested key includes a public key of the device 104A-B encrypted using the service provider's private key. The attested key can be decrypted using the public key of the service provider 116. The public key can be provided to the device 104A-B in the response at operation 206.

At operation 208, the device 104A-B stores received key materials not previously stored on the device 104A-B in the secure memory 108A-B. Upon successful registration of the device 104A-B, the secure memory 108A-B (or other memory) can include a public and private key pair, such as can be generated by the processing circuitry 110A-B, a public key of the service provider 116, and the public key (of the public and private key pair) signed by the service provider 116. The private key (of the public key and private key pair) is only known to the device 104A or 104B or the service provider 116 to which the private key belongs. This provides security as it can be difficult to determine a private key given a corresponding public key, or other data provided in authentication or exchanging cryptographically encoded information. Note that the public key of the device 104A, 104B, and the service provider 116, will generally be shared with other devices, such as the service provider 116 and/or the device 104B. The attested key (i.e. the public key of the device signed by the service provider 116) can be used by the device 104A to help prove its identity to the other device 104B, or other D2D device. In this sort of model, a D2D device acts as a signer and a verifier, such as to achieve mutual authentication between D2D devices.

Figure 3:
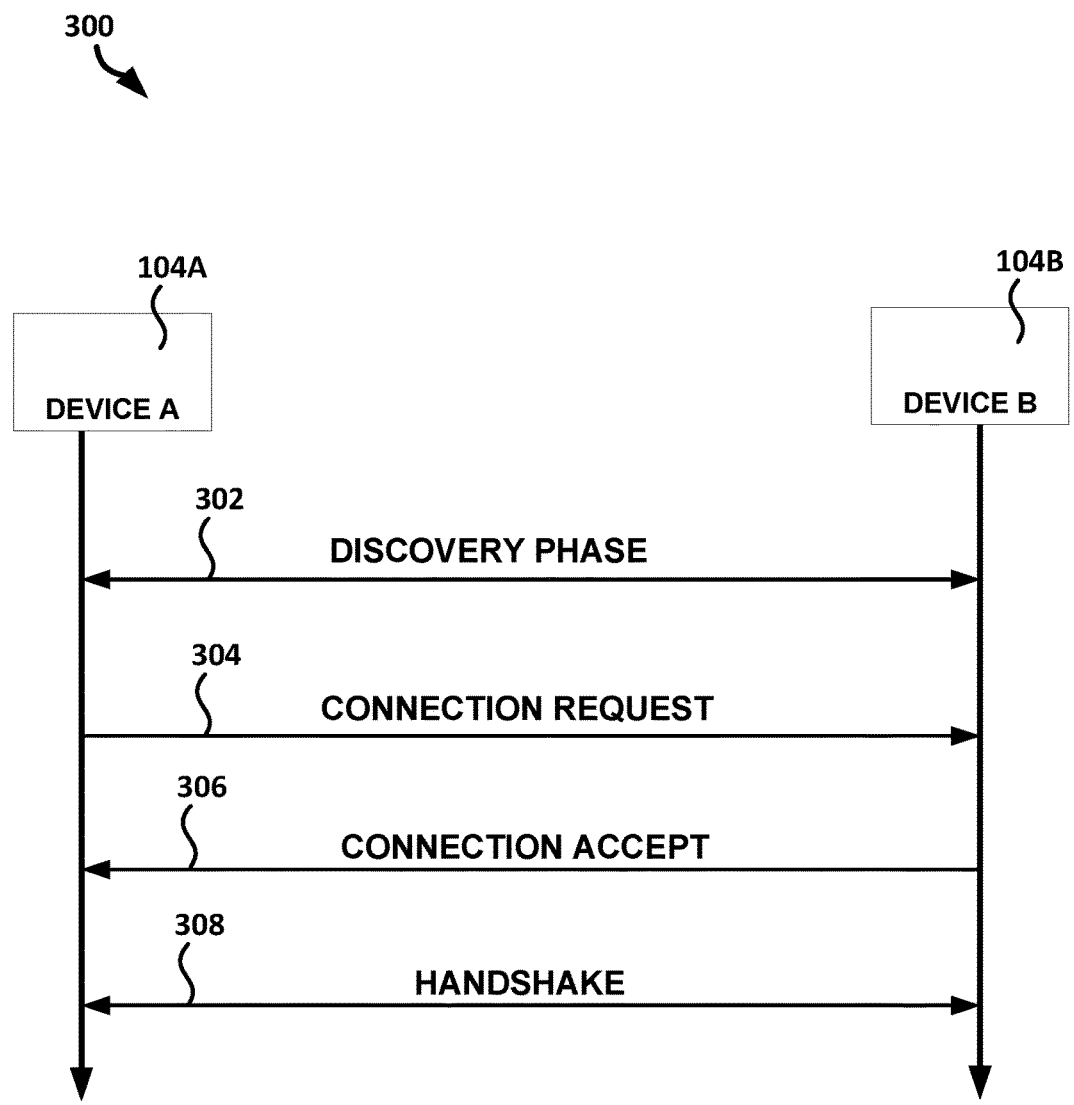
FIG. 3 illustrates, by way of example, a method for authenticated key agreement between D2D devices in accord with one or more embodiments.

FIG. 3 illustrates a method 300 for authenticated key agreement between D2D devices in accord with one or more embodiments. The method 300 as illustrated includes a D2D device discovery phase at operation(s) 302. The operation(s) 302 can include determining that another D2D enabled device is providing a matching service or looking for a matching service within sufficient proximity to the device 104A, such as by receiving a service discovery frame or a response to a service discovery frame, exchanging data regarding the security capabilities of the devices 104A-B.

The method 300 includes providing a connection request 304, such as from the device 104A to the device 104B. The connection request can be generated by the processing circuitry 110A and transmitted by the transceiver circuitry 112A-B. The connection request 304 can include the attested public key, the public key that is part of the private key and public key pair, an identification of the entity associated with the device 104A, and/or other information. The connection request 304, in one or more embodiments, can include a nonce value. The nonce value can include a timestamp of when the data was sent, a counter value, a random value, or other value as can be determined by the processing circuitry 110A. The data of the connection request 304 can be signed by the device 104A using the private key of the private key and public key pair generated by the processing circuitry 110A, such as can be generated prior to registration with the service provider 116.

The connection request operation 304, in one or more embodiments, can include information to perform a Diffie Hellman (DH) authentication protocol or other authentication protocol. Using a DH authentication protocol, the device 104A (e.g., the processing circuitry 110A) computes a DH private key, a. The DH private key can be a random value or other value as determined by the device 104A. The device 104A (e.g., the processing circuitry 110A) can compute a public key, $A=g\hat{\ }(a)$ modulus (p), where a is the private key and g is a primitive root modulo p. The integer, p, is a large prime number integer and g is also a prime number. The integers p and g can be exchanged in the discovery phase at operation(s) 302 or in the connection request at operation(s) 304. The public key A is provided to the device 104B in the connection request operation(s) 304.

The method 300 includes providing a connection accept packet at operation 306, such as from the device 104B to the device 104A. The connection accept packet can be generated by the processing circuitry 110B and transmitted by the transceiver circuitry 112B. The connection accept packet can include the attested public key, the public key that is part of the private key and public key pair generated by the device 104B, an identification of the entity associated with the device 104B, and/or other information. The connection accept packet, in one or more embodiments, can include a nonce value. The nonce value can include a timestamp of when the data was sent, a counter value, a random value, or other value as can be determined by the processing circuitry 110B. The data of the connection accept packet can be signed by the device 104B using the private key of the private key and public key pair generated by the processing circuitry 110B, such as can be generated prior to registration with the service provider 116.

The connection accept operation 306, in one or more embodiments, can include information to perform the DH protocol so as to help protect communications between the devices 104A and 104B. The device 104B can compute a DH private key, b. The DH private key, b, can be a random value or other value as determined by the device 104B. The device 104B (e.g., the processing circuitry 110B) can compute a public key, $B=g\hat{\ }(b)$ modulus (p). The integers g and p were exchanged earlier in either the discovery phase operation(s) 302 or the connection request operation(s) 304. The public key B is provided to the device 104A in the connection accept packet in operation(s) 306.

If using DH protocol, the device 104A has B from the device 104B and the private key, a, that it computed previously, and the device 104B has A from the device 104A and the private key, b, that it computed previously. The device 104A can then compute a shared secret key, $K=B\hat{\ }(a)(\text{mod}$ p), and the device 104B can also compute the same shared secret key without the device 104B knowing the private key a (or the device 104A knowing the private key b) as $K = A^{\wedge}(b)(\mod p) = B^{\wedge}(a)(\mod p)$. The shared secret key, K, can then be used to either encrypt, decrypt, or both, communications between the devices 104A and 104B.

The method 300 as illustrated includes performing a handshake at operation(s) 308. The handshake, in the context of a NAN2 D2D device exchange can include performing an 802.11i or WPA exchange to establish a secure communication session. In such embodiments, the NAN2 device can use can use any of the generated numbers, such as the public keys, private keys, secret shared keys, or other numbers (e.g., public or private key of the public and private key pair of either of the devices 104A-B, a, b, A, B, p, g, K, attested public key of either device 104A-B, public key of the service provider 116, or other value), to generate a PMK. In one or more embodiments, the PMK can include using a lower or upper 128 bits produced using a secure hash algorithm (SHA), such as SHA256 (e.g., SHA256(0x00, K, 0x01), such that the PMK can be derived from $g^{\wedge}(ab)$). The PMK can be used in the handshake operation(s) 308. During the handshake the device 104A-B can exchange data to derive one or more keys and implement advanced encryption standard (AES), temporal kip integrity protocol (TKIP), and/or a message authentication code (MAS), such as a message integrity code (MIC). AES is a standard from the National Institute of Standards and Technology (NIST). TKIP is described in the IEEE 802.11i standard. In carrying out AES or TKIP protocols, the devices 104A-B exchange or derive encryption keys from exchanged data. Michael is the MIC used in 802.11i. In carrying out a MIC protocol, the devices 104A-B exchange integrity keys.

If, during any of the operation(s) 302, 304, 306, or 308 the processing circuitry 110A-B of the device 104A-B detects an unexpected value, the device 104A-B can issue a reject packet to the other device 104B-A to terminate the authenticated key exchange of method 300.

FIG. 4 illustrates, by way of example, a connection request packet 400 in accord with one or more embodiments. The connection request packet 400 can be transmitted from the device 104A to the device 104B at operation(s) 304. The connection request packet 400 can include one or more of the fields illustrated in FIG. 4. The fields as illustrated include an attested public key of device A (the device 104A) 402, a public key of device A 404 (the public key generated and provided to the service provider 116), an identification of device A 406, a nonce value for device A 408, the public key, A 410 (discussed earlier with regard to DH protocol), the prime number, p 412 (discussed earlier with regard to DH protocol), the primitive root modulo p, g 414 (discussed earlier with regard to DH protocol). Note the data of the packet 400 may be signed by the private key of the device 104A prior to transmission to the device 104B. The public key of device A 404 can be used to decrypt the packet. The fields of the packet 400 as illustrated are optional and in no definite order. One or more of the fields can be switched with one or more of the other fields and/or one or more of the fields illustrated may be excluded from the packet 400.

FIG. 5 illustrates a connection accept packet 500 in accord with one or more embodiments. The connection accept packet 500 can be transmitted from the device 104B to the device 104A at operation(s) 306. The connection request packet 500 can include one or more of the fields illustrated in FIG. 5. The fields as illustrated include an attested public key of device B (the device 104B) 502, a public key of device B 504 (the public key generated and provided to the service provider 116), an identification of device B 506, a nonce value for device B 508, the nonce value for device A 408, and the public key, B 510 (discussed earlier with regard to DH protocol). The data of the packet 500 may be signed by the private key of the device 104B prior to transmission to the device 104A. The public key of device B 504 can be used to decrypt the packet. The fields of the packet 500 as illustrated are optional and in no definite order. One or more of the fields can be switched with one or more of the other fields and/or one or more of the fields illustrated may be excluded from the packet 500.

The combined use of self-signed and attested public key based authentication and DH key agreement may also be used in the context of Rel-13 3GPP one-to-one ProSe direct communication over the PC5 (UE-to-UE) reference point, such as by using an ECCI-based authentication and SAKKE-based key agreement when establishing a D2D communication over PC5. One or more embodiments do not incur overhead like the existing certificate based solution in terms of protocol and storage on the device. Further, the solution does not require any changes to the existing 802.11i/WPA protocols.

Figure 6:
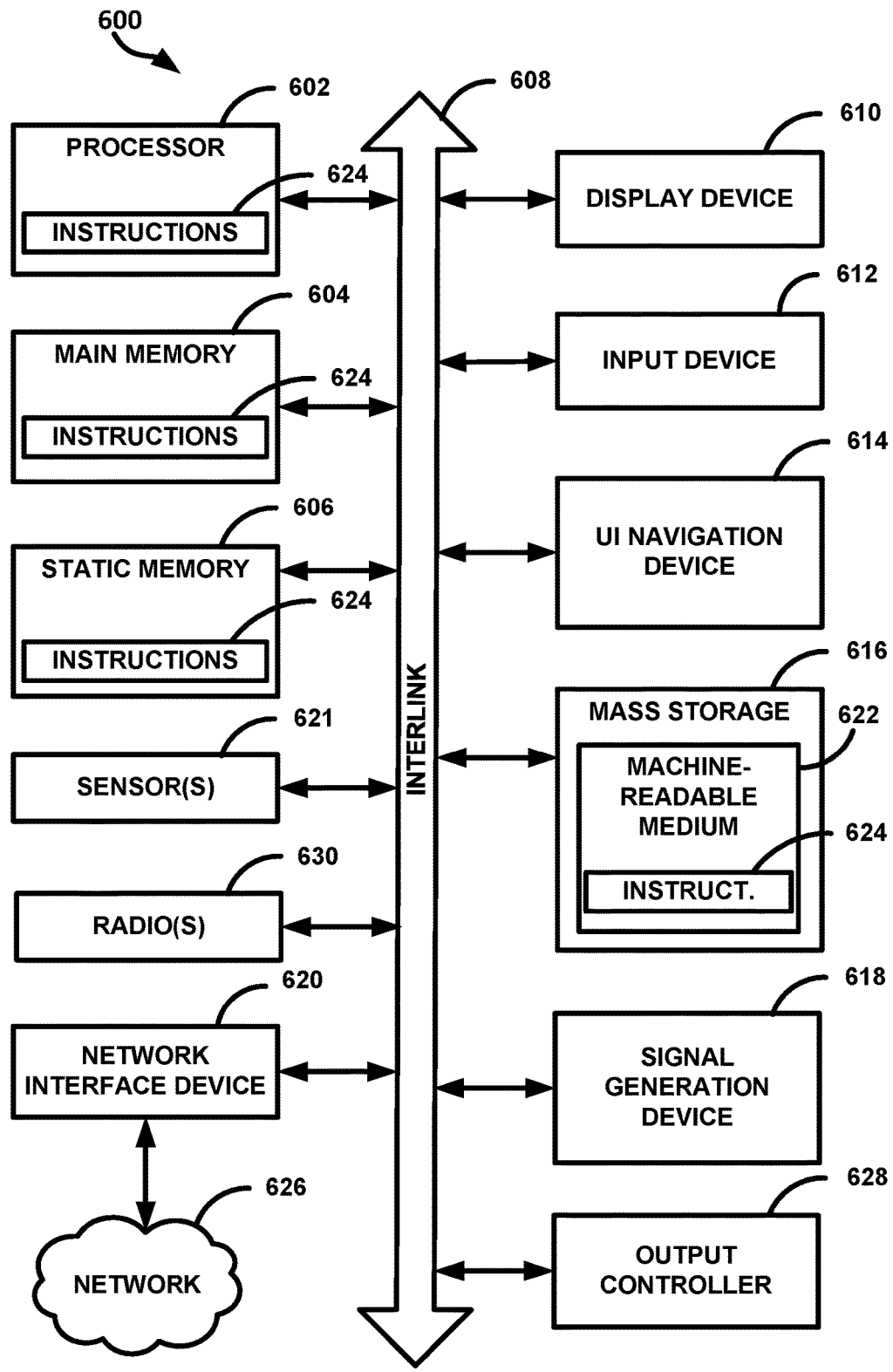
FIG. 6 illustrates, by way of example, a block diagram of a device upon which one or more of the operations discussed herein may be executed in accord with one or more embodiments.

FIG. 6 illustrates a block diagram of an example of a wired or wireless device 1100 in accord with one or more embodiments. The device 1100 (e.g., a machine) can operate so as to perform one or more of the techniques (e.g., methodologies) discussed herein. In alternative embodiments, the device 1100 can operate as a standalone device or can be connected (e.g., networked) to other machines, such as the base station 102 or the device 104A-D. The device 1100 can be a part of the base station 102 or the device 104A-D, as discussed herein. In a networked deployment, the device 1100 can operate in the capacity of a server machine, a client machine, or both in server-client network environments. In an example, the device 1100 can act as a peer machine in D2D (or other distributed) network environment. The device 1100 can include a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities (e.g., hardware) capable of performing specified operations when operating. A module includes hardware. In an example, the hardware can be specifically configured to carry out a specific operation (e.g., hardwired). In an example, the hardware can include configurable execution units (e.g., transistors, circuits, etc.) and a computer readable medium containing instructions, where the instructions configure the execution units to carry out a specific operation when in operation. The configuring can occur under the direction of the executions units or a loading mechanism. Accordingly, the execution units are communicatively coupled to the computer readable medium when the device is operating. In this example, the execution units can be a member of more than one module. For example, under operation, the execution units can be configured by a first set of instructions to implement a first module at one point in time and reconfigured by a second set of instructions to implement a second module.

Device (e.g., computer system) 1100 can include a hardware processor 1102 (e.g., a central processing unit (CPU), a graphics processing unit (GPU), a hardware processor core, or any combination thereof), a main memory 1104 and a static memory 1106, some or all of which can communicate with each other via an interlink (e.g., bus) 1108. The device 1100 can further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 can be a touch screen display. The device 1100 can additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The device 1100 can include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). The device 1100 can include one or more radios 1130 (e.g., transmission, reception, or transceiver devices). The radios 1130 can include one or more antennas to receive or transmit signal transmissions. The radios 1130 can be coupled to or include the processor 1102. The processor 1102 can cause the radios 1130 to perform one or more transmit or receive operations. Coupling the radios 1130 to such a processor can be considered configuring the radio 1130 to perform such operations. The radio 1130 can be a communication network radio configured to communicate to a base station or other component of the communication network.

The storage device 1116 can include a machine readable medium 1122 on which is stored one or more sets of data structures or instructions 1124 (e.g., software) embodying or utilized by any one or more of the techniques or functions described herein. The instructions 1124 can also reside, completely or at least partially, within the main memory 1104, within static memory 1106, or within the hardware processor 1102 during execution thereof by the device 1100. In an example, one or any combination of the hardware processor 1102, the main memory 1104, the static memory 1106, or the storage device 1116 can constitute machine readable media.

While the machine readable medium 1122 is illustrated as a single medium, the term "machine readable medium" can include a single medium or multiple media (e.g., a centralized or distributed database, and/or associated caches and servers) configured to store the one or more instructions 1124.

The term "machine readable medium" can include any medium that is capable of storing, encoding, or carrying instructions for execution by the device 1100 and that cause the device 1100 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine readable medium with a plurality of particles having resting mass. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 can further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, D2D networks, among others. In an example, the network interface device 1120 can include one or more physical jacks (e.g., Ethernet, coaxial, or phone jacks) or one or more antennas to connect to the communications network 1126. In an example, the network interface device 1120 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the device 1100, and includes digital or analog communications signals or other intangible medium to facilitate communication of such software.

EXAMPLES AND NOTES

The present subject matter can be described by way of several examples.

Example 1 can include or use subject matter (such as an apparatus, a method, a means for performing acts, or a device readable memory including instructions that, when performed by the device, can configure the device to perform acts), such as can include or use a device-to-device (D2D) enabled device comprising processing circuitry to generate a first public key which the processing circuitry is configured to use in encrypting data, a first private key which the processing circuitry is configured to use in decrypting data encrypted using the first private key, and a second private key, determine a second public key based on the second private key, provide a connection request packet including a first attested public key from a public key attestation service, the first public key, and the second public key to a second D2D communication enabled device, the first attested public key including the first public key signed by the public key attestation service, receive a connect accept packet including a second attested public key, a third public key, and a fourth public key, from a second D2D enabled device, the second attested public key from the public key attestation service and including the third public key signed by the public key attestation service, and verify an identity of the second device using the second attested public key, the third public key, and the fourth public key, and the transceiver and processing circuitry are further to establish direct communication with the second D2D communication enabled device in response to verifying the identity of the second D2D enabled device, and a secure memory coupled to the processing circuitry to store the first private key and the second private key in an encrypted form.

Example 2 can include or use, or can optionally be combined with the subject matter of Example 1, to include or use, wherein the processing circuitry includes a transceiver and processing circuitry is further to provide a request to the public key attestation service, the request including the first public key and proof of identity, and receive the first attested public key and a fifth public key from the public key attestation service, the fifth public key used to decrypt communications signed by the public key attestation service.

Example 3 can include or use, or can optionally be combined with the subject matter of at least one of Examples 1-2, to include or use, wherein the processing circuitry further includes one or more antennas coupled to the transceiver and the processing circuitry is further to determine a first nonce value and provide the first nonce value with the connection request packet to the second D2D communication enabled device, and receive a second nonce value with the connection accept packet from the second D2D communication enabled device, and wherein the processing circuitry is to verify the identity of the second device includes the processing circuitry to verify the value of the second nonce value.

Example 4 can include or use, or can optionally be combined with the subject matter of Example 3, to include or use, wherein the first and second nonce values are one of a timestamp and a counter value.

Example 5 can include or use, or can optionally be combined with the subject matter of at least one of Examples 1-4, to include or use, wherein the processing circuitry is further to generate a shared private key based on the second public key and the fourth public key.

Example 6 can include or use, or can optionally be combined with the subject matter of Example 5, to include or use, wherein the processing circuitry and transceiver circuitry are further to provide communications to the second D2D enabled device such that data of the communications is encrypted using the shared private key.

Example 7 can include or use, or can optionally be combined with the subject matter of at least one of Examples 5-6, to include or use, wherein the shared private key is generated using a Diffie-Hellman process and wherein the receiver and the processing circuitry are to provide a prime number, p, and a primitive root modulo (p), g, to the second D2D enabled device (1) prior to the provision of the first attested public key, the first public key, and the second public key or (2) with the provision of the first attested public key, the first public key, and the second public key, and wherein the processing circuitry is further to determine the second public key based on p and g.

Example 8 can include or use, or can optionally be combined with the subject matter of at least one of Examples 1-7, to include or use, wherein the processing circuitry and the transceiver are further to determine a pairwise master key (PMK) based on the second and fourth private keys, and perform, using the PMK, a handshake with the second D2D enabled device before establishing direct communication with the second D2D enabled device, wherein the handshake is used to derive and distribute one or more pairwise keys and one or more group keys including one or more encryption keys and one or more integrity keys to be used in the direct communication.

Example 9 can include or use, or can optionally be combined with the subject matter of Example 8, to include or use, wherein the handshake is a Wi-Fi Protected Access (WPA) personal four-way handshake using the determined PMK.

Example 10 can include or use, or can optionally be combined with the subject matter of at least one of Examples 1-9, to include or use, wherein the processing circuitry and transceiver are to create a shared key based on the second and fourth public keys, and in response to creating the shared key, and provide the attested public key to the second D2D enabled device encrypted based on the shared key.

Example 11 can include or use, or can optionally be combined with the subject matter of Example 10, to include or use a secure memory coupled to the processing circuitry, wherein the shared key, the first private key, the second private key, the first public key, and the second public key are stored, encrypted in the secure memory.

Example 12 can include or use, or can optionally be combined with the subject matter of at least one of Examples 1-11, to include or use, wherein, the processing circuitry is to use the shared key to create a human-readable identification, and the processing circuitry and the transceiver are to provide the human-readable identification to the second D2D enabled device to establish a subsequent connection to the second D2D enabled device.

Example 13 can include or use, or can optionally be combined with the subject matter of at least one of Examples 1-12, to include or use, wherein the D2D enabled device is a Neighbor Aware Networking (NAN2) or a Proximity Services (ProSe) enabled device.

Example 14 can include or use, or can optionally be combined with the subject matter of at least one of Examples 1-13, to include or use, wherein the connection request packet is signed by the first private key and the transceiver and the processing circuitry are further to provide the first public key to the second D2D enabled device prior to providing the connection request packet.

Example 15 can include or use subject matter (such as an apparatus, a method, a means for performing acts, or a device readable memory including instructions that, when performed by the device, can configure the device to perform acts), such as can include or use a method performed by a first device-to-device (D2D) enabled device, the method comprising performing a discovery phase process to determine if a second D2D enabled device is in sufficient proximity to the first D2D enabled device including providing a first public key of the first D2D enabled device to the second D2D enabled device and receiving a second public key of the second D2D enabled device from the second D2D enabled device, providing a connection request packet to the second D2D enabled device, the connection request packet including a first attested public key, and a third public key, the connection request packet signed using a first private key of the first D2D enabled device and decryptable using the first public key, the first attested public key including the first public key signed using a private key of a public key attestation service, receiving a connection accept packet from the second D2D enabled device, the connection accept packet including a second attested public key, and a fourth public key, the connection accept packet signed using a second private key of the second D2D enabled device and decryptable using the second public key, the second attested public key include the second public key signed using the private key of the public key attestation service, and verifying the identity of the second D2D enabled device using the second public key, the second attested public key, and the fourth public key.

Example 16 can include or use, or can optionally be combined with the subject matter of Example 15, to include or use performing a handshake process with the second D2D enabled device using a Pairwise Master Key (PMK) determined based on the third and fourth public keys, and wherein performing the handshake includes deriving and distributing one or more pairwise keys and one or more group keys including one or more encryption keys and one or more integrity keys to be used in the direct communication.

Example 17 can include or use, or can optionally be combined with the subject matter of at least one of Examples 15-16, to include or use, wherein the connection request packet further includes a first nonce value and the connection accept packet includes the first nonce value and a second nonce value, wherein the first and second values are one of a timestamp and a counter value.

Example 18 can include or use, or can optionally be combined with the subject matter of at least one of Examples 15-17, to include or use providing a request to the public key attestation service, the request including the first public key and proof of identity, and receiving the first attested public key and a fifth public key from the public key attestation service, the fifth public key used to decrypt communications signed by the public key attestation service.

Example 19 can include or use, or can optionally be combined with the subject matter of at least one of Example 17, to include or use verifying the identity of the second D2D enabled device includes verifying the identity using the second nonce value.

Example 20 can include or use, or can optionally be combined with the subject matter of at least one of Examples 15-19, to include or use, wherein the processing circuitry is further to generate a shared private key based on the third public key and the fourth public key.

Example 21 can include or use, or can optionally be combined with the subject matter of Example 20, to include or use encrypting communications from the first D2D device to the second D2D device using the shared private key.

Example 22 can include or use, or can optionally be combined with the subject matter of Example 21, to include or use, wherein the shared private key is generated using a Diffie-Hellman process and the method further comprises providing a prime number, p, and a primitive root modulo (p), g, to the second D2D enabled device (1) prior to the provision of the first attested public key, the first public key, and the second public key or (2) with the provision of the first attested public key, the first public key, and the second public key, and determining the third public key based on p and g.

Example 23 can include or use, or can optionally be combined with the subject matter of at least one of Examples 16-22, to include or use, wherein the handshake is a Wi-Fi Protected Access (WPA) personal four-way handshake using the determined PMK.

Example 24 can include or use, or can optionally be combined with the subject matter of at least one of Examples 15-23, to include or use creating a shared private key based on the third and fourth public keys, and in response to creating the shared key, providing the first attested public key to the second D2D enabled device encrypted based on the shared private key.

Example 25 can include or use, or can optionally be combined with the subject matter of Example 24, to include or use storing the shared private key, the first private key, the second private key, the first public key, and the second public key in the secure memory in encrypted form.

Example 26 can include or use, or can optionally be combined with the subject matter of at least one of Example 25, to include or use creating, using the shared key, a human-readable identification, and providing the human-readable identification to the second D2D enabled device to establish a subsequent connection to the second D2D enabled device.

Example 27 can include or use, or can optionally be combined with the subject matter of at least one of Examples 15-26, to include or use, wherein the first D2D enabled device is a Neighbor Aware Networking (NAN2) or a Proximity Services (ProSe) enabled device.

Example 28 can include or use, or can optionally be combined with the subject matter of at least one of Examples 15-27, to include or use, wherein the connection request packet is signed by the first private key and the method further comprises provide the first public key to the second D2D enabled device prior to providing the connection request packet.

Example 29 can include or use subject matter (such as an apparatus, a method, a means for performing acts, or a machine-readable storage device including instructions stored thereon that, when performed by the machine, can configure the machine to perform operations), such as can include or use provide a first public key of the machine to a device-to-device (D2D) enabled device, receive a second public key of the D2D enabled device, provide a connection request packet to the D2D enabled device, the connection request packet including a first attested public key and a third public key, the connection request packet decryptable using the first public key, the first attested public key including the first public key signed using a private key of a public key attestation service, receive a connection accept packet from the D2D enabled device, the connection accept packet including a second attested public key and a fourth public key, the connection accept packet decryptable using the second public key, the second attested public key including the second public key signed using the private key of the public key attestation service, and verify the identity of the D2D enabled device using the second public key, the second attested public key, and the fourth public key.

Example 30 can include or use, or can optionally be combined with the subject matter of Example 29, to include or use instructions which, when executed by the machine, cause the machine to perform a Wireless Personal Access (WPA) handshake with the D2D enabled device using a Pairwise Master Key (PMK) determined based on the third and fourth public keys, and wherein the instructions for performing the handshake include instructions for deriving and distributing one or more pairwise keys and one or more group keys including one or more encryption keys and one or more integrity keys to be used in the direct communication.

Example 31 can include or use, or can optionally be combined with the subject matter of at least one of Examples 29-30, to include or use, wherein the connection request packet further includes a first nonce value and the connection accept packet includes the first nonce value and a second nonce value, wherein the first and second values are one of a timestamp and a counter value.

Example 32 can include or use, or can optionally be combined with the subject matter of at least one of Examples 29-31, to include or use instructions which, when executed by the machine, cause the machine to provide a request to the public key attestation service, the request including the first public key and proof of identity, and receive the first attested public key and a fifth public key from the public key attestation service, the fifth public key used to decrypt communications signed by the public key attestation service.

Example 33 can include or use, or can optionally be combined with the subject matter of at least one of Examples 29-32, to include or use, wherein the instructions for verifying the identity of the second D2D enabled device include instructions for verifying the identity using the second nonce value.

Example 34 can include or use, or can optionally be combined with the subject matter of at least one of Examples 29-33, to include or use instructions which, when executed by the machine, cause the machine to generate a shared private key based on the third public key and the fourth public key.

Example 35 can include or use, or can optionally be combined with the subject matter of Example 34, to include or use instructions which, when executed by the machine, cause the machine to encrypt communications from the first D2D device to the second D2D device using the shared private key.

Example 36 can include or use, or can optionally be combined with the subject matter of Example 35, to include or use, wherein the shared private key is generated using a Diffie-Hellman process and the storage device further comprises instructions which, when executed by the machine, cause the machine to provide a prime number, p, and a primitive root modulo (p), g, to the second D2D enabled device (1) prior to the provision of the first attested public key, the first public key, and the second public key or (2) with the provision of the first attested public key, the first public key, and the second public key, and determine the third public key based on p and g.

Example 37 can include or use, or can optionally be combined with the subject matter of at least one of Examples 29-36, to include or use instructions which, when executed by the machine, cause the machine to create a shared private key based on the third and fourth public keys, and in response to creating the shared key, provide the first attested public key to the second D2D enabled device encrypted based on the shared private key.

Example 38 can include or use, or can optionally be combined with the subject matter of Example 37, to include or use instructions which, when executed by the machine, cause the machine to store the shared private key, the first private key, the second private key, the first public key, and the second public key in the secure memory in encrypted form.

Example 39 can include or use, or can optionally be combined with the subject matter of Example 38, to include or use instructions which, when executed by the machine, cause the machine to create, using the shared key, a human-readable identification, and provide the human-readable identification to the second D2D enabled device to establish a subsequent connection to the second D2D enabled device.

Example 40 can include or use, or can optionally be combined with the subject matter of at least one of Examples 29-39, to include or use, wherein the first D2D enabled device is a Neighbor Aware Networking (NAN2) or a Proximity Services (ProSe) enabled device.

Example 41 can include or use, or can optionally be combined with the subject matter of at least one of Examples 29-40, to include or use, wherein the connection request packet is signed by the first private key and the method further comprises provide the first public key to the second D2D enabled device prior to providing the connection request packet.

The above detailed description includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means "or", in the non-exclusive sense discussed in the previous paragraph, of all elements within the range indicated by the dash. For example, 103A-B means a nonexclusive "or" of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A device-to-device (D2D) enabled device comprising:
processing circuitry to:
generate a first public key which the processing circuitry is configured to use in encrypting data, a first private key which the processing circuitry is configured to use in decrypting data encrypted using the first private key, and a second private key;

determine a second public key based on the second private key;

provide a connection request packet including a first attested public key from a public key attestation service, the first public key, and the second public key to a second D2D communication enabled device, the first attested public key including the first public key signed by the public key attestation service;

receive a connect accept packet including a second attested public key, a third public key, and a fourth public key, from a second D2D enabled device, the second attested public key from the public key attestation service and including the third public key signed by the public key attestation service; and verify an identity of the second device using the second attested public key, the third public key, and the fourth public key;

determine a pairwise master key (PMK) based on the second and fourth public keys; and wherein the processing circuitry is further to configure a transceiver to establish direct communication with the second D2D communication enabled device in response to verifying the identity of the second D2D enabled device; and perform, using the pairwise master key a handshake with the second D2D enabled device before establishing direct communication with the second D2D enabled device, wherein the handshake is used to derive and distribute one or more pairwise keys and one or more group keys including one or more encryption keys and one or more integrity keys to be used in the direct communication; and a secure memory coupled to the processing circuitry to store the first private key and the second private key in an encrypted form.

2. The D2D enabled device of claim 1, wherein the processing circuitry includes the transceiver and processing circuitry is further to:

provide a request to the public key attestation service, the request including the first public key and proof of identity; and receive the first attested public key and a fifth public key from the public key attestation service, the fifth public key used to decrypt communications signed by the public key attestation service.

3. The D2D enabled device of claim 2, wherein the processing circuitry further includes one or more antennas coupled to the transceiver and the processing circuitry is further to:

determine a first nonce value and provide the first nonce value with the connection request packet to the second D2D communication enabled device; and receive a second nonce value with the connection accept packet from the second D2D communication enabled device, and wherein the processing circuitry is to verify the identity of the second device includes the processing circuitry to verify the value of the second nonce value.

4. The D2D enabled device of claim 3, wherein the first and second nonce values are one of a timestamp and a counter value.

5. The D2D enabled device of claim 1, wherein the processing circuitry is further to generate a shared private key based on the second public key and the fourth public key.

6. The D2D enabled device of claim 5, wherein the processing circuitry and transceiver circuitry are further provide communications to the second D2D enabled device such that data of the communications is encrypted using the shared private key.

7. The D2D enabled device of claim 5, wherein the shared private key is generated using a Diffie-Hellman process and wherein the receiver and the processing circuitry are to:

provide a prime number, p, and a primitive root modulo (p), g, to the second D2D enabled device (1) prior to the provision of the first attested public key, the first public key, and the second public key or (2) with the provision of the first attested public key, the first public key, and the second public key, and wherein the processing circuitry is further to determine the second public key based on p and g.

8. The D2D enabled device of claim 1, wherein the handshake is a Wi-Fi Protected Access (WPA) personal four-way handshake using the determined PMK.

9. The D2D enabled device of claim 1, wherein the processing circuitry and transceiver are to create a shared key based on the second and fourth public keys, and in response to creating the shared key, and provide the attested public key to the second D2D enabled device encrypted based on the shared key.

10. The D2D enabled device of claim 9, further comprising:

a secure memory coupled to the processing circuitry, wherein the shared key, the first private key, the second private key, the first public key, and the second public key are stored, encrypted in the secure memory.

11. The D2D enabled device of claim 10, wherein, the processing circuitry is to use the shared key to create a human-readable identification, and the processing circuitry and the transceiver are to provide the human-readable identification to the second D2D enabled device to establish a subsequent connection to the second D2D enabled device.

12. The D2D enabled device of claim 1, wherein the D2D enabled device is a Neighbor Aware Networking (NAN2) or a Proximity Services (ProSe) enabled device.

13. The D2D enabled device of claim 1, wherein the connection request packet is signed by the first private key and the transceiver and the processing circuitry are further to provide the first public key to the second D2D enabled device prior to providing the connection request packet.

14. A method performed by a first device-to-device (D2D) enabled device, the method comprising:

performing a discovery phase process to determine if a second D2D enabled device is in sufficient proximity to the first D2D enabled device including providing a first public key of the first D2D enabled device to the second D2D enabled device and receiving a second public key of the second D2D enabled device from the second D2D enabled device;

providing a connection request packet to the second D2D enabled device, the connection request packet including a first attested public key, and a third public key, the connection request packet signed using a first private key of the first D2D enabled device and decryptable using the first public key, the first attested public key including the first public key signed using a private key of a public key attestation service;

receiving a connection accept packet from the second D2D enabled device, the connection accept packet including a second attested public key, and a fourth public key, the connection accept packet signed using a second private key of the second D2D enabled device and decryptable using the second public key, the second attested public key include the second public key signed using the private key of the public key attestation service;

verifying the identity of the second D2D enabled device using the second public key, the second attested public key, and the fourth public key; and performing a handshake process with the second D2D enabled device using a Pairwise Master Key (PMK) determined based on the third and fourth public keys; and wherein performing the handshake includes deriving and distributing one or more pairwise keys and one or more group keys including one or more encryption keys and one or more integrity keys to be used in the direct communication.

15. The method of claim 14, wherein the connection request packet further includes a first nonce value and the connection accept packet includes the first nonce value and a second nonce value, wherein the first and second values are one of a timestamp and a counter value.

16. A non-transitory machine-readable storage device including instructions stored thereon which, when executed by the machine, configure the machine to:

provide a first public key of the machine to a device-to-device (D2D) enabled device;

receive a second public key of the D2D enabled device;

provide a connection request packet to the D2D enabled device, the connection request packet including a first attested public key and a third public key, the connection request packet decryptable using the first public key, the first attested public key including the first public key signed using a private key of a public key attestation service;

receive a connection accept packet from the D2D enabled device, the connection accept packet including a second attested public key and a fourth public key, the connection accept packet decryptable using the second public key, the second attested public key including the second public key signed using the private key of the public key attestation service; and verify the identity of the D2D enabled device using the second public key, the second attested public key, and the fourth public key;

perform a Wireless Personal Access (WPA) handshake with the D2D enabled device using a Pairwise Master Key (PMK) determined based on the third and fourth public keys; and wherein performing the handshake includes deriving and distributing one or more pairwise keys and one or more group keys including one or more encryption keys and one or more integrity keys to be used in the direct communication.

17. The storage device of claim 16, wherein the connection request packet further includes a first nonce value and the connection accept packet includes the first nonce value and a second nonce value, wherein the first and second values are one of a timestamp and a counter value.

* * * * *

UNITED STATES PATENT AND TRADEMARK OFFICE
CERTIFICATE OF CORRECTION

Page 1 of 1

PATENT NO. : 9,923,721 B2
APPLICATION NO. : 14/973211
DATED : March 20, 2018
INVENTOR(S) : Adrangi et al.

It is certified that error appears in the above-identified patent and that said Letters Patent is hereby corrected as shown below:

On the Title Page

On page 2, in Column 1, under "Other Publications", Line 3, delete "OTher." and insert --Other.-- therefor In the Claims In Column 17, Line 29, in Claim 1, after "key", insert --,--

Signed and Sealed this
Eighteenth Day of June, 2019

Andrei Iancu
*Director of the United States Patent and Trademark Office*